Oct. 12, 1937.  A. E. F. BILLSTEIN ET AL  2,095,911
FLAW DETECTOR CAR
Filed Aug. 23, 1935  7 Sheets-Sheet 3
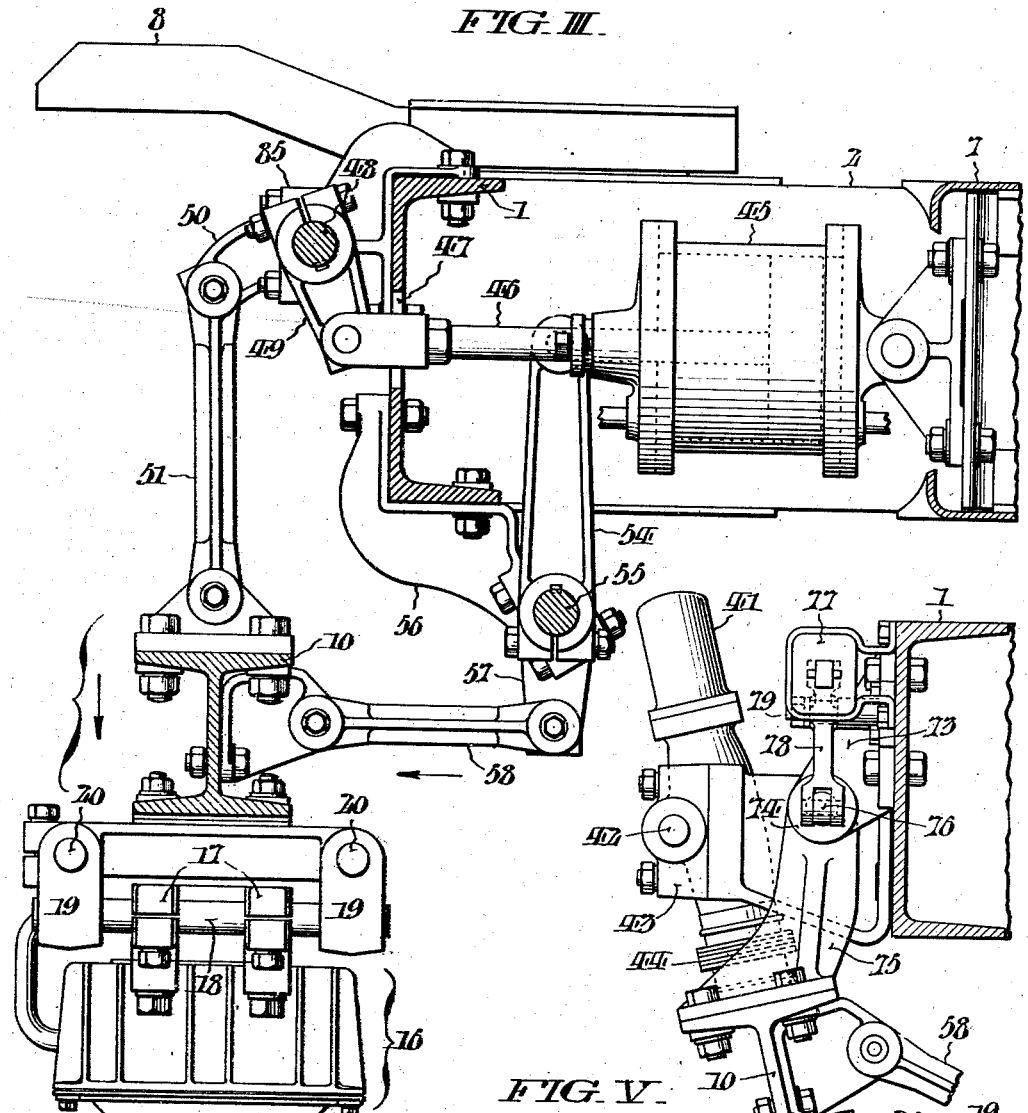
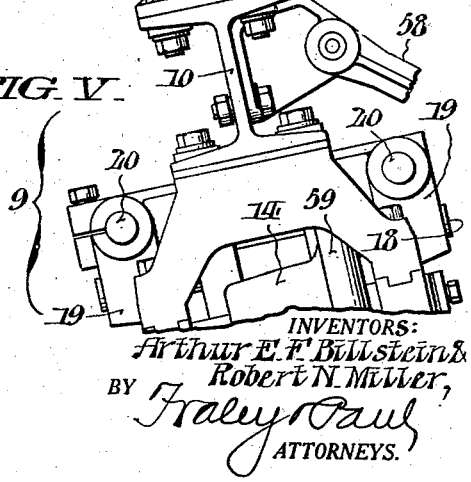

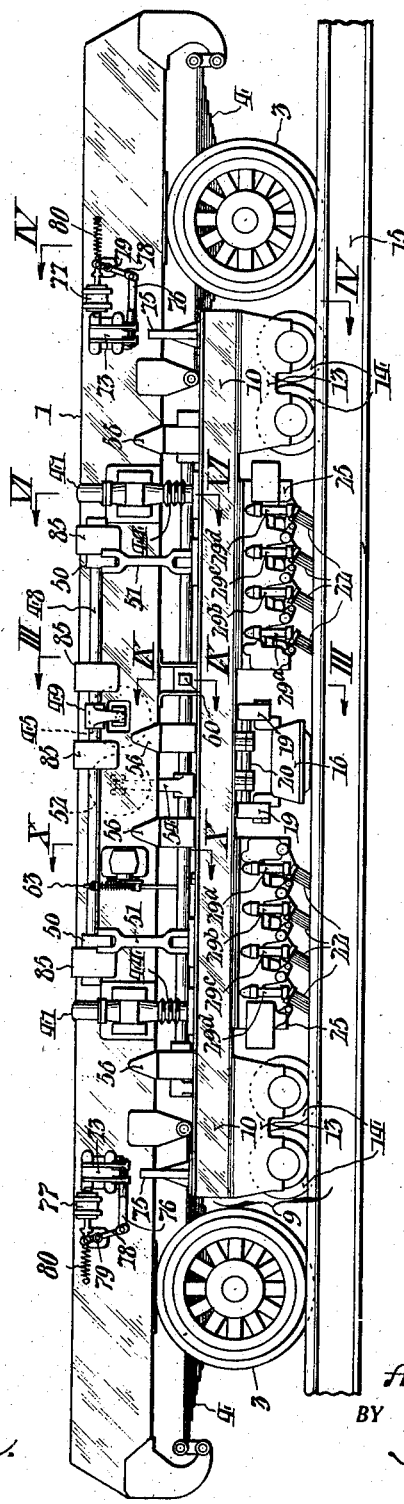

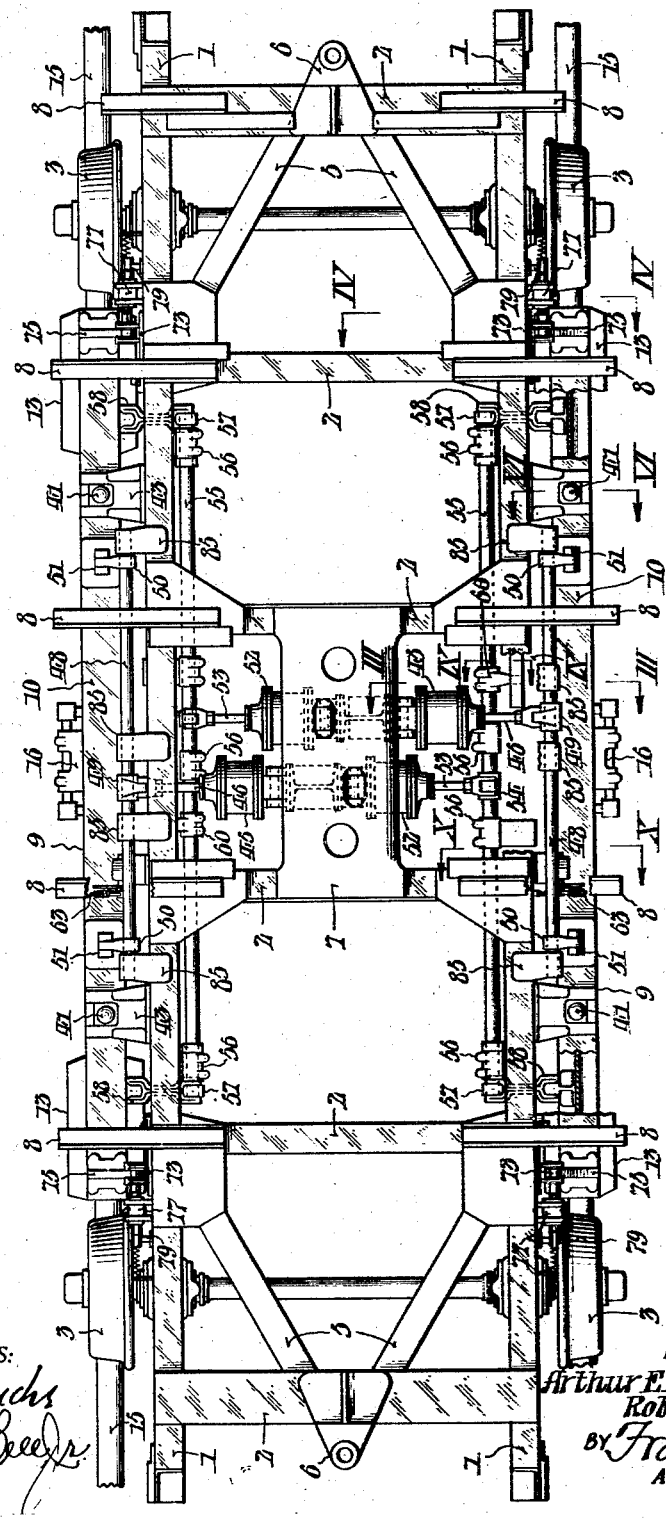

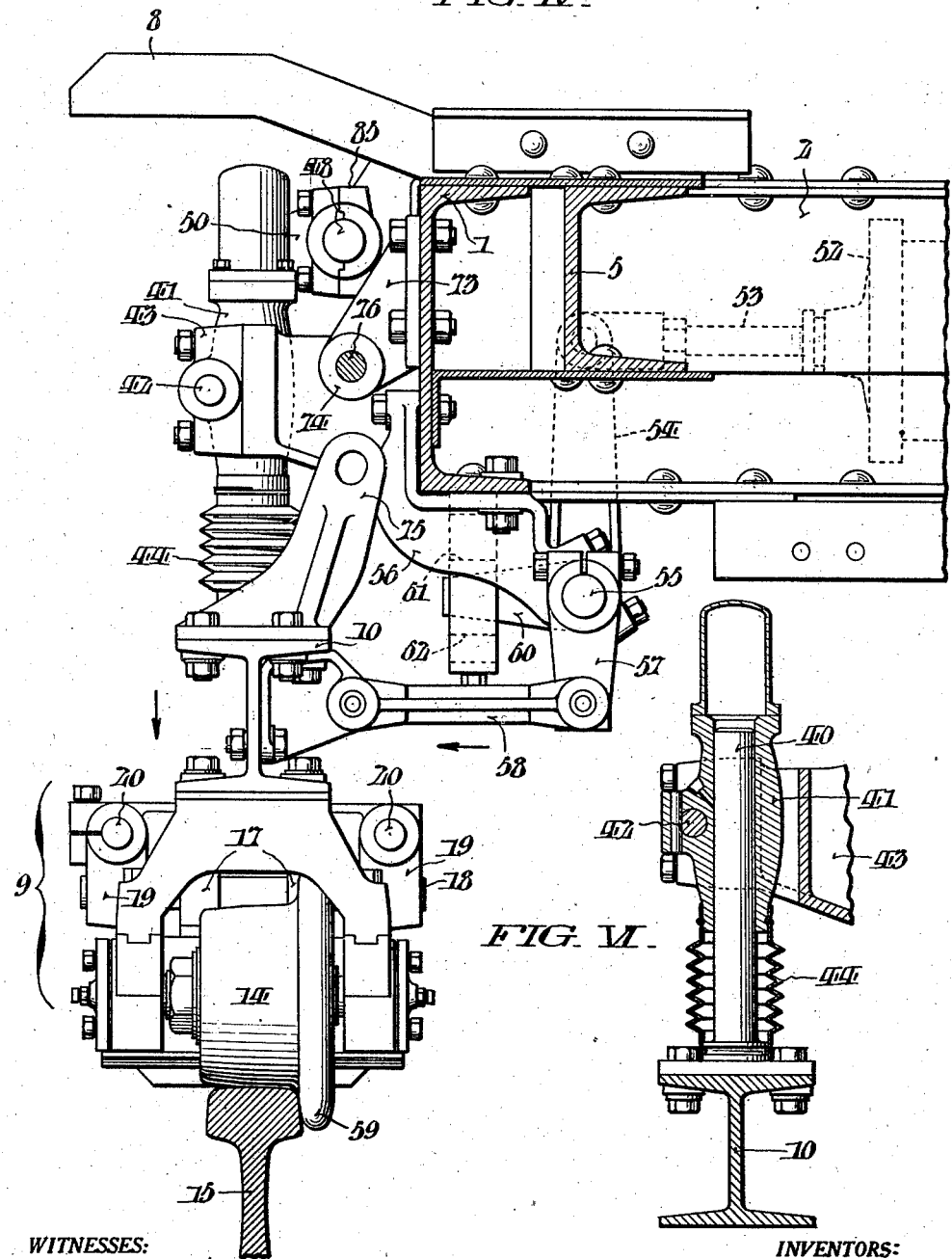

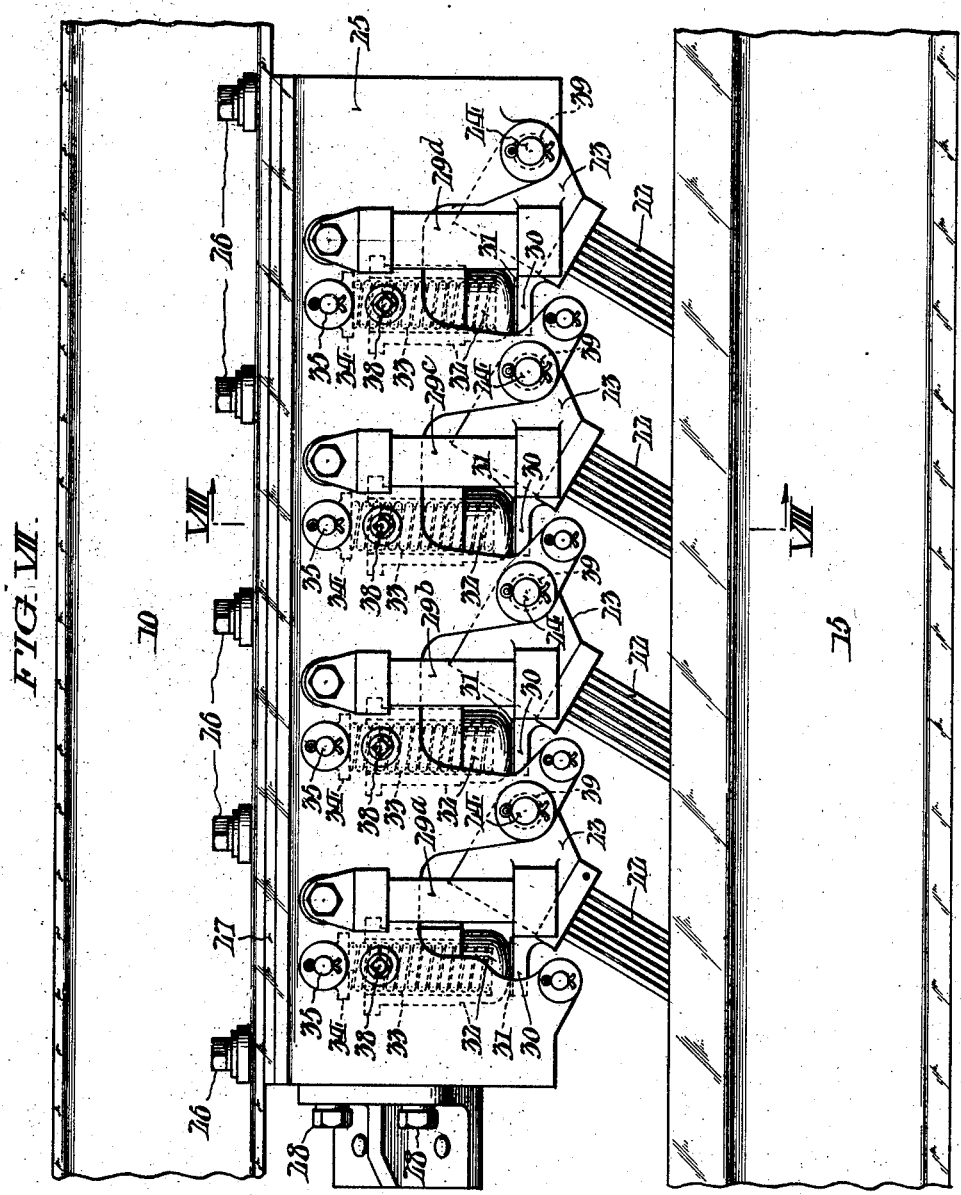

Oct. 12, 1937.  A. E. F. BILLSTEIN ET AL  2,095,911
FLAW DETECTOR CAR
Filed Aug. 23, 1935  7 Sheets-Sheet 6
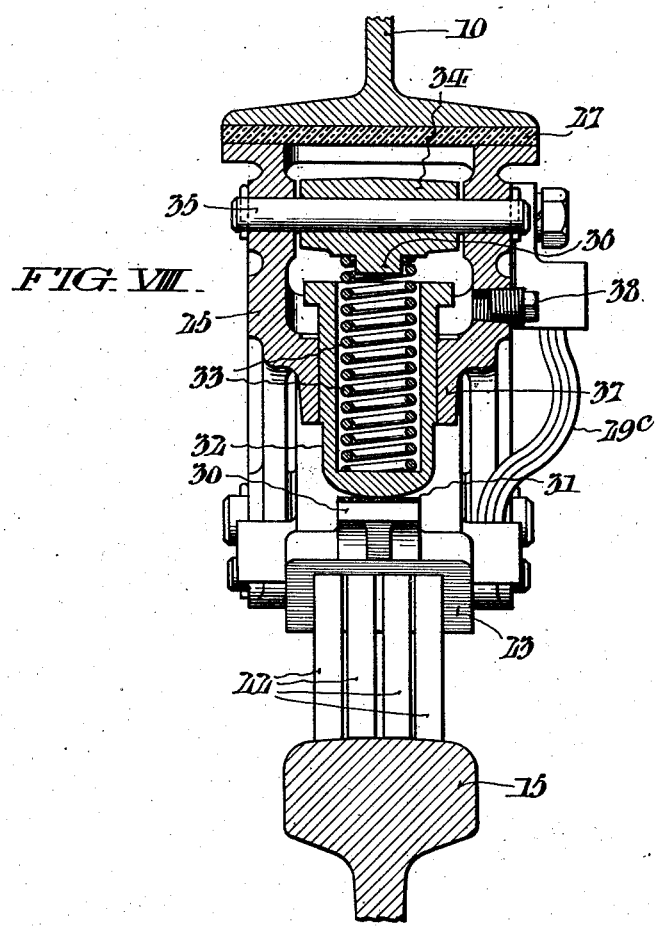
FIG. VIII.
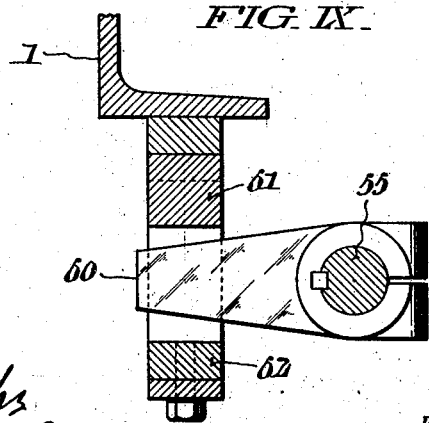
FIG. IX.
WITNESSES:
Hubert Fuchs
William Bell, Jr.
INVENTORS:
Arthur E. F. Billstein &
Robert N. Miller,
BY
Fraley Paul
ATTORNEYS.

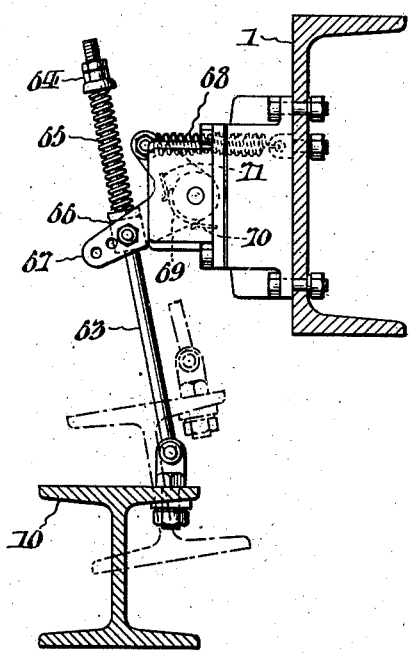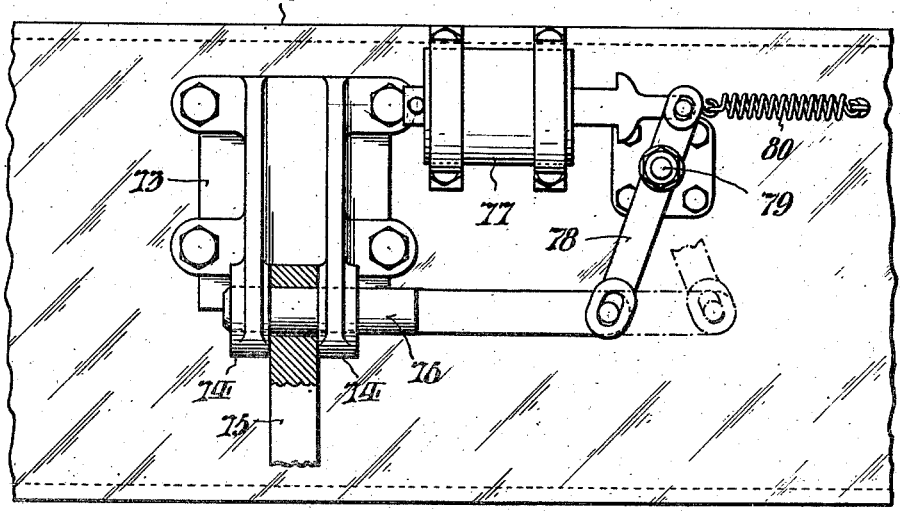

Patented Oct. 12, 1937

2,095,911

UNITED STATES PATENT OFFICE 2,095,911

FLAW DETECTOR CAR

Arthur E. F. Billstein and Robert N. Miller, Altoona, Pa., assignors to The Pennsylvania Railroad Company, Philadelphia, Pa., a corporation of Pennsylvania Application August 23, 1935, Serial No. 37,444

12 Claims. (Cl. 175—183)

This invention relates to a flaw detector car and more particularly to a car having instrumentalities thereon for detecting fissures in the rails over which it travels, including current carrying brushes which are adapted to engage the rail and to produce a magnetic field around the same, and a detector element sensitive to variations in the magnetic flux occasioned by defects in the rail. An example of such apparatus is shown in U. S. Letters Patent No. 1,963,931, granted June 19, 1934, to Arthur E. F. Billstein, which discloses the basic principle of the flaw detecting means desirably employed in the car of the present invention.

The major object of the invention is to provide an improved form of carriage for supporting flaw detecting means in the desired relation to the rail to be tested, together with mechanism for raising and lowering, as well as for gauging, the carriage wheels with respect to the rail, such mechanism being designed to hold the carriage positively in the desired position on the rail.

A further object of the invention is to provide a carriage operating mechanism of the character described in which the movements involved in positioning the carriage with relation to the rail to be tested follow in automatic succession, and additionally to provide adjusting means for regulating the particular point at which the gauging movement of the carriage takes place.

Another object of the invention is to provide a carriage in the form of a continuous beam paralleling the side sill of the car and supporting thereon the flaw detecting means, and thus to simplify materially the construction of the car as well as to produce a relatively efficient and reliable apparatus for the service to which the car is devoted.

Another object of the invention is to provide an improved mounting for the current carrying brushes in order to insure positive engagement between the brushes and the rail, and to provide means for effecting a maximum flow of current through the leading and trailing brushes located most remotely from the detector element with the resultant advantages of establishing a uniform magnetic field extending along the rail for a substantial distance forwardly and rearwardly of the detector element.

Other objects and advantages characterizing the invention will become more apparent from the description hereinafter set forth of one example or embodiment of the invention, having reference to the accompanying drawings. Of the drawings:

Fig. I represents a side elevation of a flaw detector car embodying the invention, certain parts of the car being omitted for the sake of clearness of illustration.

Fig. II represents a plan view of the same.

Fig. III represents a cross section of the car, taken as indicated by the lines III—III of Figs. I and II, and showing the mechanism for raising, lowering, and gauging, the brush carriage.

Fig. IV represents a cross section of the car, taken as indicated by the lines IV—IV of Figs. I and II, showing details of the brush carriage and the manner in which it is mounted on the car.

Fig. V represents an end elevation of the brush carriage, showing the same in the position which it occupies when not in use.

Fig. VI represents a cross section taken as indicated by the lines VI—VI of Figs. I and II, showing one of the guide rods employed on the brush carriage.

Fig. VII represents an enlarged side elevation of one of the two sets of brushes, showing the manner in which the brushes are mounted on the brush carriage.

Fig. VIII represents a cross section, taken as indicated by the lines VIII—VIII of Fig. VII, showing the manner in which the individual brush springs are housed.

Fig. IX represents a cross section, taken as indicated by the lines IX—IX of Figs. I and II, showing a stop member employed for limiting lateral movement of the brush carriage.

Fig. X represents a cross section, taken as indicated by the lines X—X of Figs. I and II, showing a detailed view of the adjustable mechanism for controlling the operation of the pressure cylinder employed for gauging the brush carriage with respect to the rail head; and Fig. XI represents an enlarged side elevation of an electro-magnetic locking means for securing the brush carriage in elevated position when not in use.

In the drawings there is shown an example of the invention as applied to a detector car of the trailer type. It will be understood, however, that the invention is equally applicable to a self-propelled car, and that the particular form of car shown in the drawings represents merely one example of many different types of cars in which the invention may be incorporated.

With reference to Figs. I and II, the detector car selected for illustration comprises generally a frame consisting of side sills 1, longitudinally-spaced, transverse frame members 2, and wheels 3 upon which the frame is supported by means of springs 4. The car frame is suitably stiffened by diagonal members 5 and has at each end thereof coupling devices 6, whereby the car may be trailed by another vehicle. A plate 7 extends longitudinally between the two center frame members 2, this plate being adapted to support compressed air tanks and other equipment not shown in the drawings. Extending outwardly from each side of the car are overhanging brackets 8 which are adapted to carry electrical conductors (not shown) of a conventional character. At each side of the car there is suspended from the side sill 1 a brush carriage, comprehensively designated at 9, which desirably takes the form of an I-beam 10, with electrical instrumentalities suspended thereon for detecting flaws in the rails. The brush carriage 9 at one side of the car is substantially identical with the brush carriage at the other side of the car, and accordingly the description which follows is confined to one of the brush carriages, it being understood that the same is duplicated at the opposite side of the car.

The brush carriage beam 10 is provided at each end thereof with bearings 13 supporting a pair of guide wheels 14. Desirably the brush carriage beam 10 extends continuously along the side of the frame in parallel relation with the side sill 1 and occupies substantially the full space between the forward and rear car wheels. The use of a pair of guide wheels 14 at each end of the carriage assists in maintaining the carriage in a truly parallel relation to the tread surface of the rail 15, for the tendency of one of the guide wheels to sink into a short depression or wheel burn in the rail surface is prevented by the engagement of the adjacent guide wheel with the rail. Suspended centrally from the brush carriage beam 10 and insulated therefrom, there is a detector element 16 rigidly supported in such manner that it is elevated a slight distance above the tread surface of the rail and disposed in parallel relation thereto. In the illustrated example, the detector element 16, see Figs. II and III, is adjustably mounted by means of a pair of clamps 17 which engage transversely extending bars 18, and an additional pair of clamps 19 which engage longitudinally extending bars 20. Such adjustment permits the detector element 16 to be adapted for use with rails of different sizes. The detector element 16, and its manner of construction and operation, form no part of the present invention, but preferably the apparatus employed operates upon the principle of flaw detection disclosed in U. S. Letters Patent No. 1,963,931, referred to above.

Suspended from the brush carriage beam 10 are two sets of current carrying brushes 22, one set being disposed forwardly of the detector element 16 and the other set rearwardly of the detector element. The particular manner in which the brushes 22 are supported is most clearly illustrated in Figs. VII and VIII. As there shown, each brush 22 is mounted on a pivoted brush holder 23 adapted to swing about a pin 24. Each set of brush holders 23 is mounted on a block 25 secured to the beam 10 by bolts 26 with the interposition of a strip of insulating material 27 between the lower flange of the beam 10 and the upper flange of the block 25. Current is carried to the block 25 through terminal connections 28, and leads through individual conductors 29a, 29b, 29c, 29d, to each brush 22. In order to maintain positive engagement between each brush 22 and the rail 15, each brush holder 23 includes an arm 30 having a pad of insulating material 31 thereon and adapted to be engaged by a vertically movable plunger 32. As shown most clearly in Fig. VIII, the brush carrying block 25 is interiorly recessed to form a housing for the plungers 32 and individual compression springs 33 for actuating the same. Associated with each spring 33, there is a cap member 34 secured to the block 25 by means of a pin 35, there being a boss 36 on the cap member centering the upper end of the spring 33 and firmly retaining the same in the desired position. Each plunger 32 is guided for vertical movement in a guideway 37 formed integrally with the block 25. A removable screw 38 permits lubricant to be admitted to the interior of the block 25 so that the spring urged plungers 32 are caused to slide freely up and down within the guideways 37. Accordingly, each brush 22 is individually urged towards the rail 15. By utilizing compression springs and vertically acting plungers of the character shown, the pressure applied to each brush holder 23 may be rendered substantially uniform, and the springs 33 are protected and retain their life for a long period of time.

Desirably each brush 22 is of laminated construction. Furthermore, the use of individual conductors 29a, 29b, 29c, 29d, leading to each brush insures a uniform distribution of current. In addition to the insulating strip 27 interposed between the brush carriage beam 10 and the block 25, and the insulated pads 31 placed on the arms 30 of the brush holders 23, there is also provided an insulating bushing 39 on each pivot pin 24. Thus current flows to each individual brush 22 in a direct path insulated from all the surrounding parts of the brush carriage 9.

With flaw detecting apparatus heretofore used and involving a plurality of current carrying brushes at each side of the detector element, it has been found that the current tends to follow the path of least resistance, so that the division of current flowing through the brushes is not uniform, more current flowing through those brushes positioned nearest to the detector element than through those brushes positioned farthest away from the detector element In order to overcome the difficulties heretofore encountered, and to prevent such short-circuiting of some of the brushes of each set, in accordance with the present invention, the individual conductors 29a, 29b, 29c, and 29d are made to progressively increase in resistance as they approach the detector element 16. Thus the conductor 29d which is situated most remote from the detector element 16 has a comparatively low resistance, and the conductor 29a which is situated nearest to the detector element 16 has a comparatively high resistance, and the intermediate conductors 29b, 29c are proportioned with intermediate values. The particular resistance for each conductor 29a, 29b, 29c, 29d is predetermined so as to offset tendency of the current to follow the path of least resistance and to provide a maximum flow of current through the brushes most remote from the detector element. An advantage of this improvement is that the effective magnetic field set up in the rail is of greater length, so that the rail is magnetized for the maximum length of time prior to the passage of the detector element 16 through the field. Moreover, as a joint is approached and passed, the current is gradually forced to flow to the rear brushes of the leading set, but not interrupted so that the maximum length of rail is tested.

The apparatus employed for suspending the brush carriage 9 at the side of the car, and for raising, lowering, and gauging, the guide wheels 14 with respect to the rail 15 is shown in detail in Figs. III, IV, V and VI. Each brush carriage 9 has associated therewith a pair of guide rods 40 projecting upwardly from the beam 10, as shown in Fig. VI, and adapted to slide within a sleeve 41, which is pivotally mounted on the car frame by means of a pin 42 supported on a bracket 43. Between the sleeve 41 and the beam 10, an accordion-plaited dust guard 44 is employed to prevent the entrance of dust or other matter around the guide rod 40. In an obvious manner the pair of guide rods 40 prevent any relative longitudinal movement between the brush carriage 9 and the car frame, but allow limited vertical movement and limited swinging movement of the brush carriage.

The means employed for raising and lowering the brush carriage 9 are most clearly shown in Fig. III. On the car frame there is mounted a pressure cylinder 45, which is conveniently termed an "elevating cylinder" and has therein a plunger with a stem 46 projecting outwardly through an opening 47 in the side sill 1. On the side sill 1 there is a rock shaft 48 supported in bearings 85 and having a crank arm 49 connected to the plunger stem 46. The rock shaft 48 has an additional crank arm 50 connected by a link 51 to the carriage beam 10. Each end of the link 51 is pivotally connected to the parts associated therewith. In an obvious manner, when the plunger stem 46 moves outwardly, the rock shaft 48 is rotated in a clockwise direction, as viewed in Fig. III, and the crank arm 50 is swung upwardly, causing the brush carriage to be elevated with its movement guided by the restraining action of the guide rods 40 within the pivoted sleeves 41. The fully lowered position of the brush carriage is shown in Fig. III.

The means employed for gauging the brush carriage 9 are most clearly shown in Fig. IV. On the car frame there is mounted a pressure cylinder 52 which is conveniently termed a "gauging cylinder." This gauging cylinder 52 includes a plunger stem 53 which projects outwardly and joins one end of a lever 54 fulcrumed at a rock shaft 55, which in turn is supported in bearings 56 mounted on the side sill 1. An additional lever 57 projects downwardly from the rock shaft 55 and is pivotally joined to one end of a link 58. The opposite end of the link 58 is pivotally connected to the carriage beam 10. In an obvious manner, inward or outward movement of the plunger stem 53 causes outward or inward lateral movement, respectively, of the brush carriage 9. Thus when the brush carriage 9 has been lowered so that the guide wheels 14 are in engagement with the rail 15, the action of the gauging cylinder 52 serves to thrust the brush carriage 9 outwardly to gauge the flanges 59 of the guide wheels 14 with respect to the rail head. It will be particularly noted that the gauging mechanism is positively operated by control of the pressure medium in the gauging cylinder 52. The application of a positive force in a lateral direction on the brush carriage 9, as distinguished from the use of flexible or resilient means, insures the maintenance of the brush carriage 9 in the desired position with respect to the rail 15 at all times, and prevents vibration or other factors from disturbing the accuracy of flaw indications.

On the rock shaft 55 which forms a part of the gauging mechanism, there is an additional arm 60 which, as clearly shown in Fig. IX, has capacity for limited swinging movement between stops 61, 62 suspended beneath the side sill 1. The elevating cylinder 45 and the gauging cylinder 52 are designed to operate in sequence with the movement of the latter cylinder following automatically the completion of the movement of the former cylinder. In order to obtain such automatic movement, the mechanism shown in Fig. X is employed. On the carriage beam 10, there is a rod 63 which has at the upper end thereof an adjusting nut 64 bearing upon a spring 65. The lower end of the spring bears upon a sleeve 66 attached to one arm of a bell crank lever 67. The other arm of the bell crank lever 67 is urged by a spring 68 inwardly toward the side sill 1. At its fulcrum the bell crank lever 67 is provided with an arcuate segment 69 which completes an electrical circuit between contacts 70, 71. The contacts 70, 71 form part of a circuit leading to a magnet valve or the like (not shown) which controls the admission and exhaust of the pressure medium to the gauging cylinder 52. The revolving segment 69 actuated by the bell crank lever 67 serves to make and break the circuit to initiate the operation of the gauging cylinder 52 at the proper point. Inasmuch as the rod 63 is raised and lowered corresponding to the movement of the carriage beam 10, by adjusting the tension of the spring 65 by means of the adjusting nut 64, the mechanism can be regulated so that the circuit controlling the operation of the gauging cylinder 52 will be closed when the brush carriage is lowered to the level of the rail. Accordingly, when it is desired to operate the car for detecting rail flaws, the elevating cylinder 45 is first operated to cause a lowering of the brush carriage 9 (such operation may also be accomplished from a remote station by means of a magnet valve), and then, after the guide wheels 14 of the brush carriage have reached the level of the rails, the gauging cylinder 52 is automatically brought into action to thrust the guide wheels outwardly and maintain the desired positive engagement between the brush carriage and rails.

The normal housed position of the brush carriage 9 is represented in Fig V, and it will be noted that provision is made for locking the brush carriage 9 in its elevated position as a matter of safety to insure against accidental dropping of the carriage while the car is being moved along the rails at a high speed. The locking means are most clearly represented in Fig. XI. On the side sill 1 near each end thereof, brackets 73 are provided, each of these brackets including a pair of apertured projecting lugs 74. On the carriage beam 10 near each end thereof, there is an upstanding perforated lug 75 which is adapted to fit between the lugs 74 of the bracket 73. To lock the brush carriage 9 in its raised position, a pin 76 is employed which passes through the holes in the lugs 74, 75 to occupy the position indicated in Fig. XI. The pin 76 is moved away from its operative position by means of an electro-magnet 77 which is connected to the end of the pin by a lever 78 fulcrumed at 79. A spring 80 is connected to one end of the lever 78 in such manner as to tend to force the pin 76 into locking engagement with the lug 75. Accordingly, when the electro-magnet 77 is deenergized, the pin 76 is brought into locking engagement with the lug 75 by means of the spring 80, and when the electro-magnet 77 is energized the pin 76 is withdrawn and the brush carriage released so that it may be lowered to the rail. In order to release the pin 76, it may be found desirable to first apply pressure at the lifting cylinder 45 to take the weight of the brush carriage 9 off the pin 76, and then to energize the electromagnet 77 to withdraw the pin.

The operation of the rail detector car of this invention will be apparent from the above description of its component parts. It will be particularly noted that the mechanism for moving the brush carriage involves separate and independent instrumentalities, one for raising and lowering, and one for gauging the brush carriage, with such instrumentalities operating in automatic succession. The weight of the brush carriage 9 is ordinarily sufficient to prevent relative vertical movement between the guide wheels 14 and the rail 15, and relative lateral movement between the guide wheels and rail is prevented by the gauging mechanism which thrusts the carriage laterally towards the rail head in a substantially horizontal plane and with a substantially positive force.

The use of a brush carriage having the form of a continuous beam extending in parallel relation with the side sill of the car, provides a relatively simple and inexpensive construction and one which is nevertheless substantially rigid and particularly well adapted for carrying flaw detecting apparatus.

While the invention has been described in some detail and with reference to one particular embodiment thereof in a trailer car, it will be apparent that various changes may be made in the particular form of the car and the various mechanical and electrical instrumentalities thereon, and that certain features of the invention may at times be used to advantage without a corresponding use of other features, all without departing from the spirit of the invention as defined in the annexed claims.

Having thus described our invention, we claim:

1. A flaw detector car comprising a car frame having wheels thereon, a continuous beam suspended at the side of said frame, said beam having guide wheels at the ends thereof adapted for engagement with a rail and having flaw detecting means suspended therefrom, a pair of rock shafts mounted on said frame, and means connecting said rock shafts to said beam, one of said rock shafts serving to raise and lower said beam and the other serving to move said beam laterally to gauge said guide wheels with respect to the rail head and to maintain said guide wheels firmly against said rail head while the car is in motion.

2. A flaw detector car comprising a car frame having wheels thereon, a beam suspended from a side sill of said frame in parallel relation thereto, said beam having guide wheels at its ends adapted for engagement with a rail and having suspended flaw detecting means, a pair of rock shafts mounted on said frame, means connecting said rock shafts to said beam, one of said rock shafts serving to raise and lower said beam and the other serving to move said beam laterally to gauge said guide wheels with respect to the rail head, a sleeve pivoted on said side sill and adapted to swing in a vertical plane transverse to the longitudinal axis of the frame, and a guide rod rigidly attached to said beam and fitting in the sleeve aforesaid and serving to prevent relative longitudinal movement between said beam and side sill.

3. In a flaw detector car, a frame, a wheeled carriage movably mounted on said frame at the side thereof, flaw detecting means suspended from said carriage, means including a pressure cylinder for lowering and raising said carriage respectively towards and away from the rail, means including a second pressure cylinder for effecting positive lateral movement of said carriage respectively towards and away from the rail, mechanism for controlling the operation of said second pressure cylinder, and means whereby the movement of said carriage to lowered position actuates said mechanism to initiate lateral movement of the carriage thereby to gauge the carriage wheels with respect to the rail head.

4. In a flaw detector car, a frame, a wheeled carriage movably mounted on said frame at the side thereof, flaw detecting means suspended from said carriage, means including a pressure cylinder for lowering and raising said carriage respectively towards and away from the rail, means including a second pressure cylinder for effecting lateral movement of said carriage respectively towards and away from the rail, mechanism for controlling the operation of said second pressure cylinder, and means whereby the movement of said carriage to lowered position actuates said mechanism to initiate lateral movement of the carriage thereby to gauge the carriage wheels with respect to the rail head, said mechanism being so adjusted that said pressure cylinders are caused to operate in sequence whereby the gauging of the carriage automatically follows the lowering thereof to the level of the rail.

5. In a flaw detector car, a frame, a carriage suspended at the side of said frame and having guide wheels adapted for engagement with a rail, flaw detecting means suspended from said carriage including current carrying brushes adapted to engage the rail, brush holders pivoted on said carriage and carrying said brushes, and spring-urged plungers fitting in recesses formed interiorly of the carriage and guided thereby, said plungers engaging said brush holders and individually urging the brushes against the rail head.

6. In a flaw detector car, a frame, a carriage suspended at the side of said frame comprising a continuous beam having guide wheels at the ends thereof for engagement with a rail, flaw detecting means suspended from said carriage including a detector element rigidly attached to the underside of said beam and insulated therefrom, brush carrying blocks rigidly attached to the underside of said beam forwardly and rearwardly of the detector element and insulated therefrom, spring urged plungers fitting in recesses formed interiorly of the casing and guided thereby, said plungers engaging said brush holders and individually urging the brushes against the rail head, and individual conductors leading to each of said brushes.

7. In a flaw detector car, a frame, a carriage suspended at the side of said frame having guide wheels adapted for engagement with the rail, flaw detecting means suspended from said carriage including a detector element and sets of current carrying brushes disposed forwardly and rearwardly of said detector element, the brushes of each set being spaced longitudinally of the rail, and individual conductors leading to each of said current carrying brushes, the conductors for each set of brushes progressively increasing in resistance as they approach the detector element.

8. In a flaw detector car, a frame, a carriage suspended at the side of said frame having guide wheels adapted for engagement with the rail, flaw detecting means suspended from said carriage including a detector element and sets of current carrying brushes disposed forwardly and rearwardly of said detector element, the brushes of each set being spaced longitudinally of the rail, and individual conductors leading to said current carrying brushes, the conductors leading to the brushes situated most remotely from the detector element being of less resistance than the conductors for the brushes situated nearest the detector element.

9. In a flaw detector car, a frame, a wheeled carriage movably mounted on said frame at the side thereof, flaw detecting means suspended from said carriage including current carrying brushes adapted to engage the rail, means for raising and lowering said carriage, means for effecting lateral movement of said carriage thereby to gauge said wheels with respect to the rail head, means including a spring actuated pin for locking said carriage in its raised position to the frame, and electro-magnetic means for effecting a movement of said pin to unlock the carriage.

10. A flaw detector car comprising a car frame with wheels, a carriage with guide wheels for engaging a track rail and having flaw detecting means suspended therefrom, lever-supported link means whereby the carriage is suspended at one side of the car frame with capacity for up and down and lateral movement, means for raising and lowering the carriage, and means operative through leverage means coordinated with the link means aforesaid, for effecting lateral movement of said carriage to gauge its guide wheels in respect to the rail head and to maintain said guide wheels firmly against said rail head during travel of the car.

11. A flaw detecting car comprising a car frame with wheels, a carriage with guide wheels at each end thereof adapted to engage with a track rail and having flaw detecting means suspended therefrom including a search unit and electric current carrying brushes, lever-supported link means whereby the carriage is suspended at one side of the car frame with capacity for up and down and lateral movement, means for raising and lowering the carriage, and means operative through leverage means coordinated with the link means aforesaid, for effecting lateral movement of the carriage to gauge its guide wheels in respect to the rail head and to maintain said guide wheels firmly against the rail head during travel of the car.

12. A flaw detecting car comprising a car frame with wheels, a carriage with guide wheels at each end thereof adapted to engage with a track rail and having flaw detecting means suspended therefrom including a search unit and electric current carrying brushes, lever-supported link means whereby the carriage is suspended at one side of the car frame with capacity for up and down and lateral movement, means for raising and lowering the carriage, means operative through leverage means coordinated with the link means aforesaid, for effecting lateral movement of the carriage to gauge its guide wheels in respect to the rail head and to maintain said guide wheels firmly against the rail head during travel of the car; and locking means controllable from a remote point and cooperative with the link means in securing the carriage in elevated position clear of the rail.

ARTHUR E. F. BILLSTEIN.
ROBERT N. MILLER.